United States Patent
Heyrman et al.

(10) Patent No.: US 9,298,651 B2
(45) Date of Patent: Mar. 29, 2016

(54) CONTINUOUS IN-MEMORY ACCUMULATION OF HARDWARE PERFORMANCE COUNTER DATA

(71) Applicant: International Business Machines Corporation, Armonk, NY (US)

(72) Inventors: Peter J. Heyrman, Rochester, MN (US); Venkat R. Indukuru, Austin, TX (US); Carl E. Love, Beaverton, OR (US); Aaron C. Sawdey, Cannon Falls, MN (US); Philip L. Vitale, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 13/925,760

(22) Filed: Jun. 24, 2013

(65) Prior Publication Data
US 2014/0379953 A1 Dec. 25, 2014

(51) Int. Cl.
| | |
|---|---|
| G06F 11/00 | (2006.01) |
| G06F 13/16 | (2006.01) |
| G06F 9/30 | (2006.01) |
| G06F 11/34 | (2006.01) |
| G06F 11/30 | (2006.01) |

(52) U.S. Cl.
CPC .......... G06F 13/1689 (2013.01); G06F 9/3004 (2013.01); G06F 11/3037 (2013.01); G06F 11/3409 (2013.01)

(58) Field of Classification Search
CPC .............. G06F 11/302; G06F 11/3037; G06F 11/3065; G06F 11/3072; G06F 11/3075; G06F 11/3409; G06F 11/3467; G06F 11/348; G06F 11/3485
See application file for complete search history.

(56) References Cited

U.S. PATENT DOCUMENTS 5,727,167 A 3/1998 Dwyer et al.
6,314,530 B1 * 11/2001 Mann ......................... 714/38.11
(Continued)

FOREIGN PATENT DOCUMENTS

JP 06-223558 A 8/1994

OTHER PUBLICATIONS

Pin, Eddy, "Hardware Performance Monitoring in Memory of NUMAchine Multiprocessor", University of Toronto (1997).
(Continued)

*Primary Examiner* — Yolanda L Wilson
(74) *Attorney, Agent, or Firm* — Steven L. Bennett; Jack V. Musgrove (57) ABSTRACT

In-memory accumulation of hardware counts in a computer system is carried out by continuously sending count values from full-speed hardware counter units to a memory controller. A sending unit periodically samples performance data from the hardware counter units, and transmits count values to a bus interface for an interconnection bus which communicates with the memory controller. The memory controller responsively updates an accumulated count value stored in system memory using the current count value, e.g., incrementing the accumulated count value. A count value can be sent with a pointer to a memory location and an instruction on how the location is to be updated. The instruction may be an atomic read-modify-write operation, and the memory controller can include a dedicated arithmetic logic unit to carry out that operation. A data harvester can then be used to harvest accumulated count values by reading them from a table in system memory.

20 Claims, 5 Drawing Sheets

(56) References Cited

U.S. PATENT DOCUMENTS

| | | |
|---|---|---|
| 6,360,337 B1 | 3/2002 | Zak et al. |
| 6,507,921 B1 * | 1/2003 | Buser et al. .................... 714/45 |
| 6,556,952 B1 * | 4/2003 | Magro ........................ 702/183 |
| 7,058,839 B2 | 6/2006 | Imming |
| 7,197,586 B2 | 3/2007 | DeWitt et al. |
| 7,797,503 B2 * | 9/2010 | Bellofatto et al. ............ 711/163 |
| 7,877,759 B2 | 1/2011 | Gara et al. |
| 2005/0086028 A1 | 4/2005 | Jones et al. |
| 2007/0286327 A1 | 12/2007 | Love et al. |
| 2008/0046700 A1 * | 2/2008 | Gara et al. ................... 712/227 |
| 2008/0163220 A1 * | 7/2008 | Wang et al. .................. 718/101 |
| 2008/0263263 A1 | 10/2008 | Love et al. |
| 2009/0007134 A1 * | 1/2009 | Chiu et al. .................... 718/106 |
| 2010/0162247 A1 * | 6/2010 | Welc et al. .................... 718/101 |
| 2011/0173403 A1 | 7/2011 | Gara et al. |
| 2011/0182491 A1 | 7/2011 | Levin et al. |
| 2012/0089979 A1 | 4/2012 | Adar et al. |
| 2012/0304020 A1 | 11/2012 | Chiu et al. |

OTHER PUBLICATIONS

SYS-ED/Computer Education Techniques Inc., "Performance Counters", App. E (2003).

\* cited by examiner

| Record Type | Data Source | Memory Transaction | Post-Read Source Op |
|---|---|---|---|
| Timebase | Timebase | Direct Write | Read-Only |
| Update Count | Constant "1" | Atomic-Add | Always "1" |
| Period | Elapsed Time | Atomic-Add | Clear on Read |
| Counter 1 | Counter 1 | Atomic-Add | Clear on Read |
| Counter 2 | Counter 2 | Atomic-Add | Clear on Read |
| Counter 3 | Counter 3 | Atomic-Add | Clear on Read |
| Counter 4 | Counter 4 | Atomic-Add | Clear on Read |
| Status:TB[16:63] | Status and Timebase | Direct Write | Read-Only |

CONTINUOUS IN-MEMORY ACCUMULATION OF HARDWARE PERFORMANCE COUNTER DATA

BACKGROUND OF THE INVENTION

1. Field of the Invention

The present invention generally relates to monitoring of computer systems, and more particularly to a method of accumulating performance data from hardware counters in a computer system or device.

2. Description of the Related Art

As electronic systems become more complicated, there is a greater need for monitoring the performance of the systems to ensure optimum operation and identify any defects or design problems. This concern is particularly important for integrated circuits such as processors and other state-of-the-art devices used in computer systems. A typical processor includes various execution units, registers, buffers, memories, and other functional units which are all formed by integrated circuitry. Hardware counters may be embedded within this circuitry to keep track of various events. Today's processors typically provide performance monitoring counters that count the time, cycles, or other types of events between a first event and a second event. For example, if latency is to be measured, the counted events are typically cycles, and typical start and stop events might be instruction fetch and instruction completion, load fetch and load completion, or cache miss and cache reload. Alternatively, if the reason for a large cache reload latency is being investigated, typical start and stop events might be cache load and cache reload, and the counted events might be load retries in the interconnection fabric, or some action that is performed in order to reload the cache. In addition to counting events between a start and a stop event, it is often desirable to see if the number of counted events exceeds a given threshold, or to measure how frequently the number of counted events exceeds the threshold. In order to provide this additional functionality, the hardware can support a threshold register which contains the value against which the total number of counted events is to be compared. Values in hardware counter registers may be swapped out with previously stored values as part of a context switch which changes the state of the processor Due to the complexity of today's processors, there is a large number of different types of events that can be counted, as well as a large number of different possible start and stop events that need to be specified. The typical numbers of counted events between start and stop events for a complex computer system can vary over a huge range. For example, some pairs of start and stop events may be separated by only a few counted events, whereas other pairs of events may be separated by a million or more counted events.

SUMMARY OF THE INVENTION

The present invention is generally directed to a method and system for accumulating hardware counts by maintaining a current count value for a counted event of a hardware component of an electronic system in a hardware counter unit, and sending the current count value to a memory controller which controls access to a system memory device of the electronic system. The memory controller responsively updates an accumulated count value stored in the system memory device of the electronic system using the current count value. For example, the memory controller can increment the accumulated count value according to the current count value. In the exemplary application the electronic system is a computer system and the hardware component is a processor core the computer system which processes program instructions residing in the system memory device. The system may include a sending unit which periodically samples performance data from the hardware counter unit including the current count value, and transmits the current count value to a bus interface for an interconnection bus which communicates with the memory controller. The current count value can be sent with a memory pointer to a location in the system memory device, and an instruction on how the location is to be updated. In the illustrative implementation the instruction is for an atomic read-modify-write operation. The memory controller can include a dedicated arithmetic logic unit to carry out the atomic read-modify-write operation. A data harvester application can be used to harvest accumulated count values by reading them from a table in the system memory device.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Each generation of computer hardware is more complex than the previous. As design complexity increases, so does performance variance. Assessment and response to an extremely wide range of customer workloads in the field becomes more important. Hardware performance instrumentation must be designed to meet these increasing demands, but traditional approaches to continuous performance monitoring of entire systems have been hampered by a number of limitations that make deployment in the field prohibitively expensive, either in the initial investment in design or in the continuing cost of operation. Among these limitations are the following.

There can be relatively short intervals before counters overflow. This pace requires interrupt overflow servicing or frequent polling to avoid loss of data. Both of these servicing methods consume hardware and software execution resources.

In prior art systems, there are usually small numbers of full speed counters, because chip area for constructing counters and the associated event, control, and data path wiring is expensive. Often this pressure forces intensive use of event multiplexing which historically requires host processor intervention (workload interruption) to read, store, and configure the performance counters.

If the design focus is on virtual device monitoring. Measurement scope may be restricted to the operating system image (logical partition) in which they are used. If this is the only data available, it becomes nearly impossible to coordinate the simultaneous virtual machine (simultaneous partition) measurements necessary to construct a performance snapshot of the entire system across all physical devices. Conversely, if the design focus is on physical device monitoring, there is no aligned bridge back to the virtual domain (logical partition or virtual machine). Physical device counters may also lack bridges to the underlying software code state.

In implementations with long data paths to connect event sources with centralized hardware counters, hardware performance counters often cannot be located right next to the logic they are to monitor. Performance monitors are especially necessary in some of the most complicated areas of chip design. Long direct-event data paths are expensive in terms of area, power consumption, and test.

For context switching, there is extra overhead of state (extra counter registers) that must be saved and restored on changes in physical to virtual mapping (partition swaps). This overhead consumes system resources that could be better spent on executing workloads of value to Service Providers and End-Use Customers.

Conventional monitoring systems use widely differing collection and data-access interfaces. Interfaces to program and operate performance monitors located within physical devices are usually different from those within the virtual devices. Different interfaces within the same system, (or from one generation of system hardware to the next), add to development cost and increase the opportunity for deployment errors.

Prior art systems are further not friendly toward direct sharing amongst many monitoring applications. The local hardware performance counters are a scarce and highly-valued resource. Current methods for sharing these counters increase measurement interval requirements and increase the overhead of saving and restoring state within the operating system for each application.

It would, therefore, be desirable to devise an improved method of performance data monitoring which could overcome the foregoing limitations. It would be further advantageous if the method could be suited for system wide hardware performance monitoring in all operational environments, in the lab and at customer sites in the field. The present invention achieves these objectives using a novel in-memory accumulation (IMA) mechanism. First, IMA continuously updates extensive tables in memory, populating them with hardware performance event counts (thousands per chip are easily maintained). Second, the mechanism performs its data collection and accumulation with minimal consumption of hardware and software resources, and as a result its operation will be nearly unobservable. Third, the data is accumulated in memory in such a manner that system operation can be accurately and simultaneously characterized from the viewpoints of physical-device, virtual-machine, and code state. Fourth, IMA provides a uniform interface that can be used by performance-monitoring tools at all levels in the system. Fifth, the IMA components are simple to design and inexpensive to implement.

Figure 1:
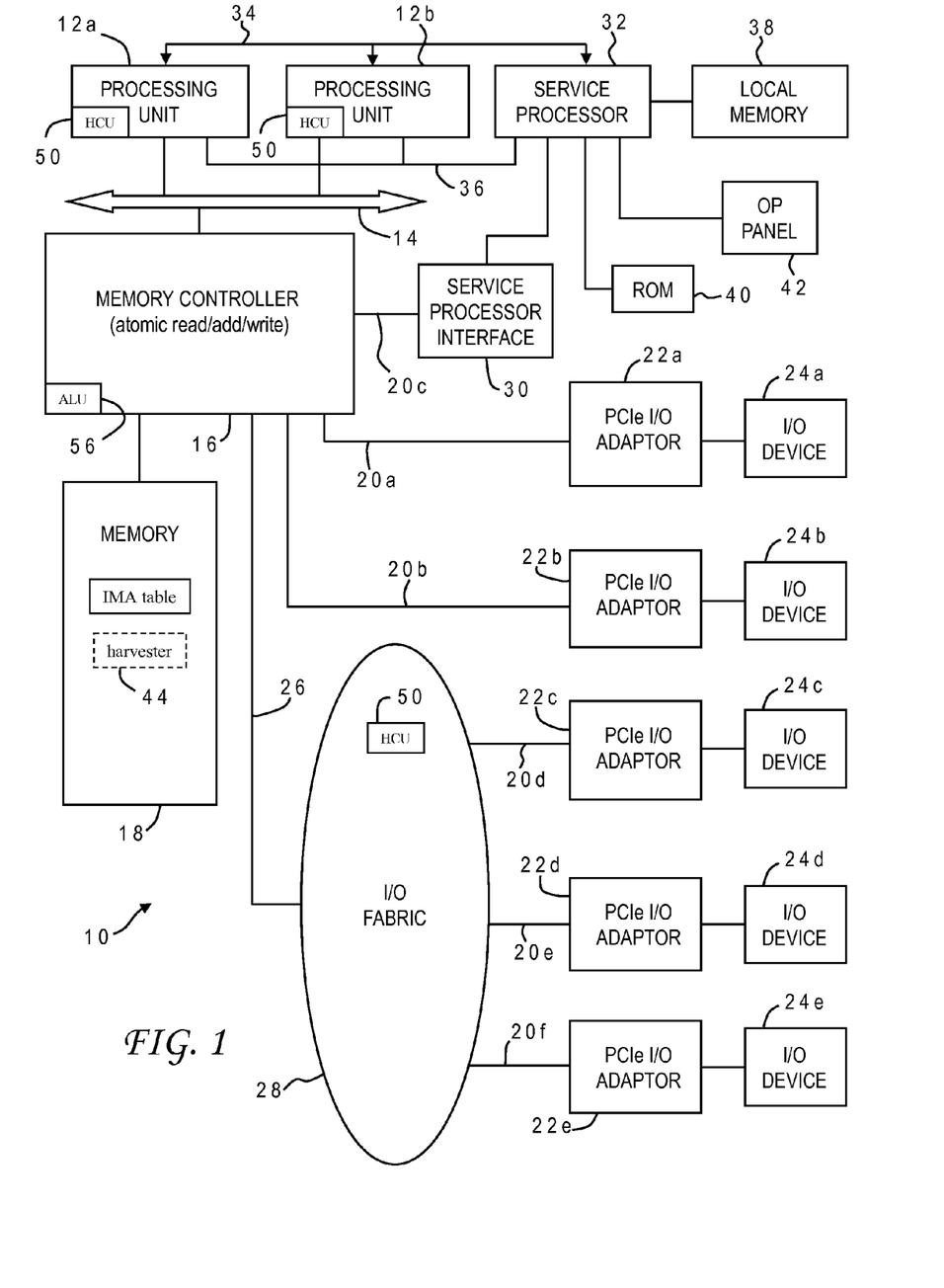
FIG. 1 is a block diagram of a computer system constructed in accordance with one embodiment of the present invention, having hardware counters whose performance data is accumulated within the system's main memory.

With reference now to the figures, and in particular with reference to FIG. 1, there is depicted one embodiment 10 of a computer system constructed in accordance with the present invention. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular a performance monitoring application (harvester) 44 which is ancillary to the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the data harvester application that can be used in conjunction with the present invention may be embodied as a system, method or computer program product. Accordingly, the application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such computer-readable storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 has a plurality of hardware counter units (HCUs) 50 embedded in different components of the system. In the depicted embodiment, HCUs are provided in each of the host processors 12a, 12b, and in the interconnection fabric 28. The HCUs count performance events local to the source component without loss. Data from an HCU is periodically sampled by a sending unit. The function of the sending unit is to combine addressing and data into a record set and then initiate posting those record sets to large memory tables in system memory 18. Multiple postings may be efficiently managed through multiple base address registers (BARs). Postings may be offset in time to support historical collections. After formatting the record sets the sending unit then passes those sets to a bus interface. Additional address construction may occur in the bus interface. The bus interface can write each record in a record set to memory controller 16. Memory controller 16 interprets each data record and command and may respond with an arithmetic operation to a memory location if indicated. When the entire record set has been committed to posting to memory, the next collection interval is set up in the HCU. Large and wide tables of hardware performance data now become available to performance monitoring applications.

Figure 2:
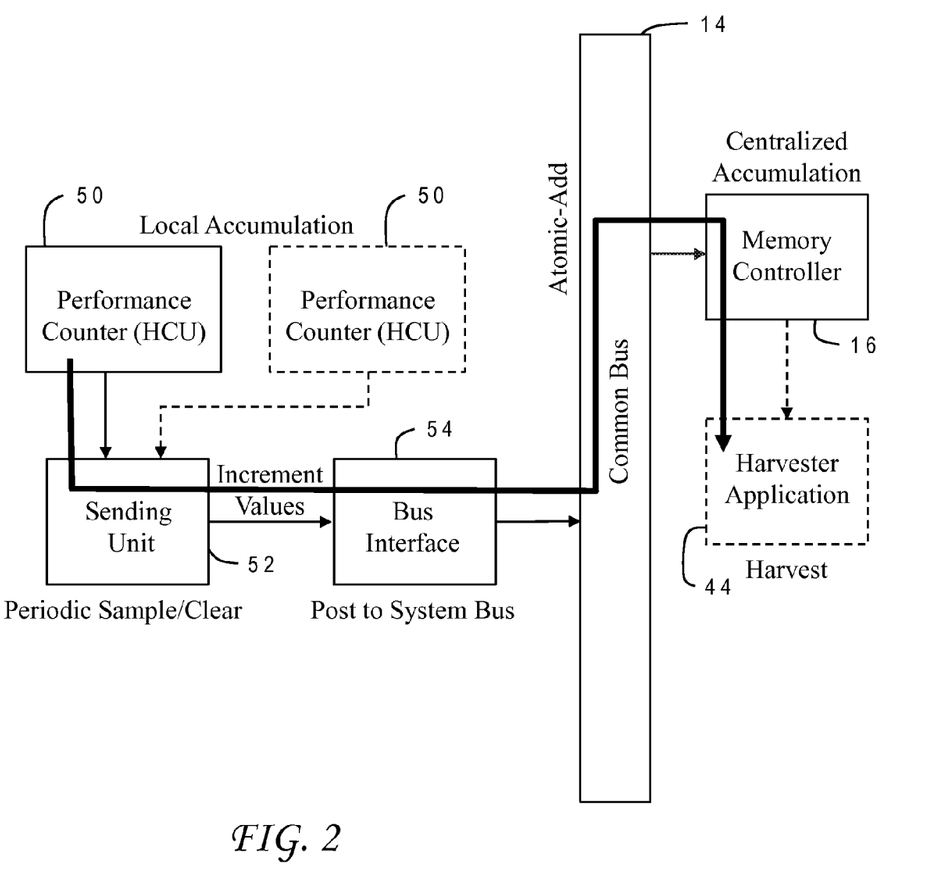
FIG. 2 is a high-level schematic diagram illustrating the operation of in-memory accumulation of hardware counter performance data in accordance with one implementation of the present invention.

One example of the in-memory accumulation of performance data from HCUs 50 is schematically illustrated in FIG. 2. HCUs 50 are configured to count performance events at full speed (with no loss) within in their logic domain. There may be multiple monitoring domains; in an exemplary implementation there are three: the thread-level domain, the core-level domain (bridge between physical and virtual), and the chip-level domain (memory controller, bus, i/o, interconnect links, etc.). An accurate assignment of the measurement interval may also be collected. If performance monitoring requirements allow for the additional delay in overall harvesting of data, event sources for the counters may be multiplexed to expand performance event type coverage of the hardware counter unit. The HCUs could for example be adapted from that described in U.S. patent application Ser. No. 13/312,715 filed Dec. 6, 2011. In that HCU, occurrences of a particular event in an electronic device are counted by incrementing an event counter each time a variable number of the particular events have occurred, and automatically increasing that variable number geometrically each time the count mantissa overflows.

Data from HCU 50 is periodically sampled by the sending unit. Suspension of further accumulation or buffering may be incorporated to maintain alignment across multiple counters in HCU 50. Sending unit 52 forms an address offset based on a function of time, monitored event data, and the source domain. Each update set may consist of multiple records. All records in an update set are to be sent together to persistent locations in memory, or none of them are to be posted to memory. In the illustrative embodiment it is the responsibility of sending unit 52 to format the address base and the associated performance data for simplified decoding by other logic units. To maintain HCU data alignment across multiple domains, sending unit 52 may simply post the same record set more than once, updating multiple tables (one table per domain). For example, concurrent virtualization data may be collected by simply posting the same record set to two tables: one to the current virtual processor core, and one to the physical core (that the virtual processor core is mapped onto). Location of accumulation tables (or portions of tables) may be placed under control of the operating system. The number of BARs determines the number of hardware-supported concurrent performance analysis views, for example, physical core, virtual core, physical thread, virtual thread, etc. Access permissions may be managed by the particular domain involved, e.g., hypervisor (for logical partitions), operating system, or user application. Table or entry offsets may be advanced on postings or at time intervals creating time-series recordings of monitored performance counter data. A series of shorter measurement intervals will reveal peak event frequencies more accurately than long accumulation averages.

After formatting, sending unit 52 passes all update record sets on to the bus interface 54. Bus interface 54 combines the address offset from sending unit 52 with the base address set by a system-wide management entity (the Hypervisor) to form the absolute address in memory for the record set that is being updated. Bus interface 54 then processes each record in the update set one by one. Some records in the update set are to be written unaltered to memory, such as a timestamp or an identification tag. Some records are meant to be interpreted as read-modify-write operations (in-memory increments for example). Bus interface 54 ensures that the command type to process each record in the data payload is appropriate for its associated memory controller operation. Bus interface 54 also handles a memory coherency protocol for the record being sent to the memory controller to ensure data consistency.

Commands from bus interface 54 are issued to the common (system) bus 14 where they are picked up by memory controller 16. Memory controller 16 processes each command and the associated data payload that is sent by bus interface 54. For example, memory controller 16 can update an accumulated count value by incrementing it in an amount equal to a count value in the performance data. Memory controller 16 includes a co-located local arithmetic logic unit (ALU) 56 that is dedicated to memory controller operations. When an atomic ALU operation is received by the appropriate memory controller, the data at the specified memory location is read, the operation is performed (for example, an add operation), and the new result is stored back in place. The read-modify-write operation in the memory controller may be performed in a cache or buffer as long as system memory coherency rules are observed. The operation is considered atomic in that the entire read-modify-write procedure is completed as if it were a single operation, i.e., any interruption of the procedure would lead to a retry of the entire procedure. The operand sizes of the memory locations that are targeted for ALU operations may be different than the source of the data payloads. For example, 8-bit increments as inputs to a sending unit may build 64-bit accumulations in persistent memory locations. Once the entire record set is committed to posting to memory, the next collection interval can be set up in the HCU.

Update commands do not necessarily need to be sent via the bus interface. They can be sent via any circuit which allows communications with the memory controller. They can also be sent directly as may be seen, for example, in FIG. 1 pertaining to the HCU 50 within I/O fabric 26.

The maintenance of large and wide hardware performance event counter tables in memory completes the portion of the in-memory accumulation process that is performed continuously and practically autonomously by hardware. The accumulation is continuous in the sense that it is repeated often and regularly. The tables make access and interpretation by harvesting applications relatively simple. In the exemplary implementation, harvesting application 44 reads ENTRANCE values from the IMA tables, waits some predetermined period of time, and then reads EXIT values from the tables. A differential is calculated for performance counts and the elapsed measurement time. Those differentials (reconstructed increments) are used in the performance analysis performed by harvester application 44. Access to accumulation tables may be direct or through some management entity (such as the operating system or hypervisor). Table entries are designed so that multi-record updates may be detected by harvester 44. A timestamp can serve both to precisely position the measurement in a system context, and to serve as a simple "picket" indicating that a record set was read while it was being updated.

In-memory accumulation as taught herein takes full advantage of exponential decreases in processing rate requirements as hardware performance data passes through three stages: collection, accumulation, and analysis. In the monitoring domain closest to the logic source of the performance event, IMA performs no-loss full-speed accumulations into local hardware counters. Measurement time is also collected. Periodically increments from the local counters are posted to accumulation locations in memory. Posting rates may be a thousand times slower than the rate at which the no-loss local accumulation is performed. Performance-monitoring applications then read the counter accumulation tables from memory at rates that might be measured in a range spanning hundreds of milliseconds to weeks. IMA further takes advantage of the relatively infinite size (width and depth) of memory compared to local counter logic.

In-memory accumulation has many advantages over traditional hardware performance counter collection methods. By decoupling local (no-loss) event count accumulation from accumulation in memory, the local counters can be made narrow as counters in memory can be made wide enough to remove requirements for overflow checking. For example a 64-bit memory accumulation location may take a hundred years to overflow to count at processor clock rates found in today's processor designs. That 64-bit accumulator may be fed with increments that may be smaller, e.g., 16-bits. Because there is nothing unique about memory locations used for accumulations (atomic-add), the IMA counter population is limited only by the memory allocated for this purpose. In today's servers, a mere 0.001% of the memory behind a chip can hold more than two million 64-bit IMA counters. The entire collection, posting, and accumulation process is performed by (modest amounts) of hardware logic. Once memory allocations are determined and base address registers are set, IMA consumes almost nothing in the way of processor resources to collect data into large memory tables. IMA operates continuously and needs no cross partition (no cross virtual machine) coordination to perform system wide monitoring. In-memory accumulation extends existing (non-exotic) hardware logic components and data paths, including local hardware performance counters, a common processor bus, and memory controllers. This approach makes for reduced design and testing costs.

Multiple postings can be used to accumulate data aligned to different domains. For example, if the local hardware performance counters for IMA are placed in the processor core the following domains may be analyzed using aligned cross-domain data (physical core, virtual core, and code state). The additional bus and memory resources consumed by multiple postings are more than made up by the ability to assemble precisely aligned tables that are collected from these different domains. Because close-out postings to memory can be performed when there are partition (virtual machine) changes, there is no need to save the register state. In a simpler IMA configuration, one new base address needs to be written for the incoming partition pointing to its persistent tables in memory. The hypervisor can proceed with partition swap operations in parallel with IMA logic close-out postings.

The IMA tables also offer uniform interfaces and can be as simple as an index added to a base address. By abstracting the performance event, a reasonably portable interface can be maintained across domains on the same system and potentially from one hardware generation to the next. Although the IMA tables preferably have only one writer, the use of timestamps and record update indicators creates support for large numbers of concurrent readers (i.e., harvesters). Incremental postings to the memory controller are performed at rates that are magnitudes lower than local counting of events. This approach economizes the use of bus and memory access bandwidth.

Figure 3:
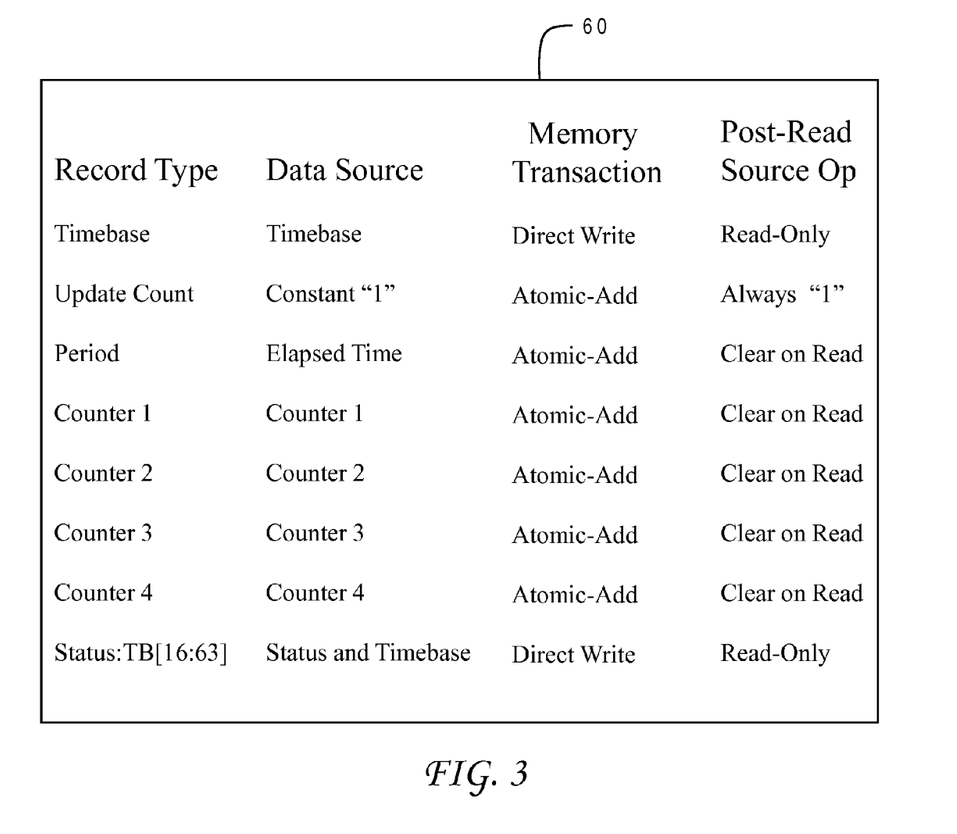
FIG. 3 is an example of a group entry in memory for performance data from a hardware counter unit in accordance with one embodiment of the present invention.

With further reference to FIG. 3, in one implementation example the sending unit is located in a processor core, and its HCU consists of a simple mix of four counters: two that have fixed-event sources (i.e., the same two events are recorded by a set of different HCUs), and two that have programmable-event sources. There are a total of 256 events that can be configured as inputs for the two programmable HCU counters. An elapsed time counter can also be present in the HCU which precisely matches the time period when the HCU counters were monitoring. The automatic multiplexing of hardware event sources is performed by a counter driven by expiration of an interval timer, with one HCU group per interval timer overflow. To facilitate accurate cross-table entry analysis, the two fixed-event HCU counters and the elapsed time counter can be used as bridge (normalization) values. For this example, an HCU group entry 60 in memory contains the elements seen in FIG. 3. HCU group entry 60 contains eight records types including the timebase, an update count, a time period, four count values (two fixed, two programmable), and a status indicator. Each record type has an associated data source, a memory transaction, and a post-read source operation.

General design considerations for an IMA implementation include: location of the IMA sending unit (it could be in any hardware unit of computer system 10); the number of local (no-loss) HCU performance counters; different IMA tables (domains) driven by data from each HCU (sets BARs); the method of configuring IMA domain table selection; the method of updating IMA tables in memory (e.g., manual, automatic, or hybrid); the minimum refresh rate for automatic IMA table entry update; the number of event sources for programmable HCU counters (if any); the configuration method for the HCU counters (e.g., manual, automatic, or hybrid); normalization support across table entries; the method for indicating that an IMA table entry is in the process of being updated by a sending unit; and access controls over IMA tables in memory.

Figure 4:
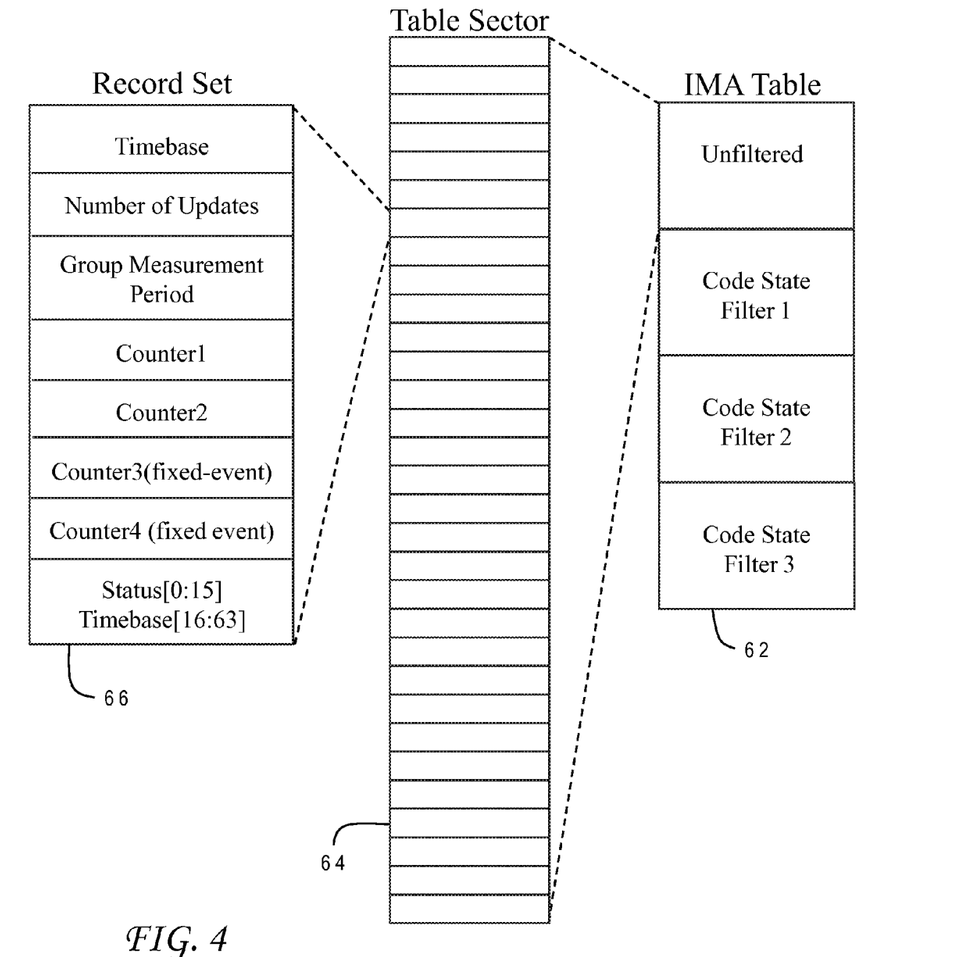
FIG. 4 is a chart illustrating the construction of an in-memory accumulation (IMA) table having record sets organized into different sectors in accordance with one implementation of the present invention.

A more specific example for implementation of the IMA table construction is seen in FIG. 4. IMA table 62 is divided into four sectors 64, each sector 64 containing multiple record sets 66. Each record set contains the performance data and associated information per the record types seen in FIG. 3. Changing the HCU configuration from one to the next forces an update to memory tables. Because of this, the interval timer in effect can also set the minimum update rate. For this example, the interval timer has eight settings (in milliseconds): 0.5, 1, 4, 16, 64, 256, 1024 and 4096. Event selection in the HCU is a hybrid of manual and automatic selections. All 256 base events are scanned automatically using hardware (128 groups), but filtering of designated table sections is performed. The filters are based on status bits maintained in a hardware register by the operating system. This filtering helps build a link between the underlying software and the physical and virtual devices that the software is running on. An event mask register holds the code state filter settings. For the depicted embodiment, one quarter of the HCU event groups (32) will have no filtering and the rest (96) will be filtered by one of three mask settings (32 groups per mask setting field). The three sets of mask values will breakout performance event counter accumulations by code delineations such as "kernel", "user" and "hypervisor". In an alternative implementation, a counter might count the number of instructions executed by a core in general whereas a filter might result in a count for only a specific type of instruction, e.g., floating-point.

To efficiently bridge analysis from physical to virtual devices, two hardware base address registers (BARs) can be used to support concurrent IMA table accumulations for the virtual processor core (VPCBAR) and the physical processor core (PPCBAR). The value in the VPCBAR points to one or more tables of HCU entries that are accumulated from the standpoint of a virtual processor core device; the value in the PPCBAR points to one or more tables that are accumulated from the standpoint of a physical processor core device. In addition to table entry updates caused by an expiration of the interval Timer, postings to the IMA tables can be also triggered by a write to the VPCBAR (indicating a change in virtual to physical mapping). In most cases, the incoming virtual processor core will have a different IMA table for accumulation than the one used by the outgoing virtual processor core. The elapsed time counter compensates for variability of update intervals caused by the uncorrected interaction between updates including those caused by the VPCBAR and those caused by the expiration of the interval timer. To extend virtualization analysis, additional VPCBAR tables can be supported by the hypervisor. Because the address in the VPCBAR is set in host code by the hypervisor on a partition (virtual machine) mapping change, any number of VPCBAR table breakouts are possible. For this example, four table splits can be implemented to provide a more detailed characterization of a virtual processor core while it executes under different affinity environments such as 'home" physical processor core, "home" physical chip, "home" node, and "remote" node. Address offsets are formed by the sending unit in the core. In the illustrative implementation they are constructed by concatenating the event multiplexor index and record offset within each entry. If time-series collections are performed, then the bits that select the rolling buffer entry can be placed just above the multiplexor index.

Figure 5:
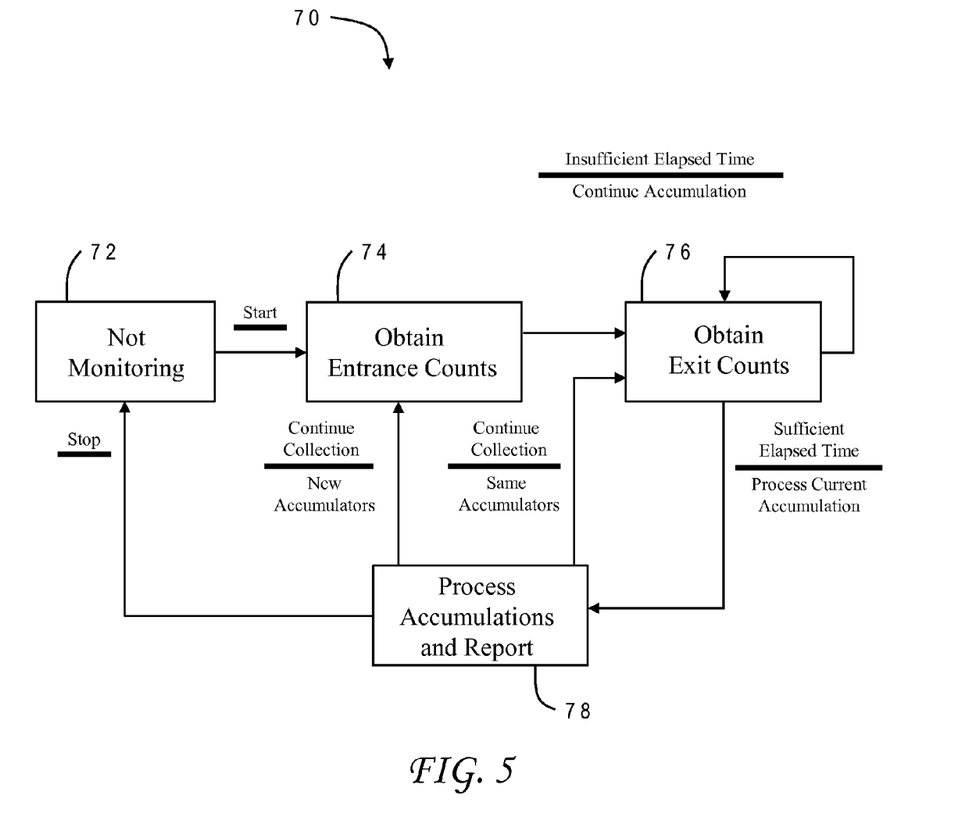
FIG. 5 is a chart depicting the logical flow for a harvester state machine which monitors the IMA performance data in accordance with one implementation of the present invention.

Finally, the IMA table data must be read out of memory and into a performance monitoring application (a data harvester). One implementation for a harvester state machine 70 is illustrated in FIG. 5. When the process begins, the harvester is not monitoring (72). ENTRANCE counts are obtained by reading current values of IMA record sets of interest (74). The data harvesters can interpret and respond to status codes that are returned in the IMA record sets. After waiting for a predefined measurement interval, EXIT counts are obtained by read current values of the same IMA record sets of interest (76). The accumulations are then processed according to the particular monitoring function of the harvester (78). For example, the harvester might calculate exit-to-entrance count deltas (differences), and report or analyze the resulting count deltas. These steps are repeat until the monitoring activity is terminated.

The harvesters may also be designed to support for asynchronous sampling. While the individual "add to memory" and "store to memory" 64-bit operations are atomic in themselves, the posting of a complete IMA record set does not need to be. Using a standard synchronization mechanism (such as the POWERPC instructions LARX/STCX) would likely result in contention in the memory Controller and could also complicate the hardware logic. One asynchronous solution for large IMA tables is to set up the previously mentioned "picket" at the front and back of each record set. In this example, part of the initial timebase value is repeated again as a closing marker to indicate that a complete record set has been posted to memory.

In-memory accumulation as taught herein responds to the need for continuous and unobtrusive system-wide monitoring of hardware components. The present invention accordingly has wide application to areas such as quality of service, service-level agreements, charge-back assessments, customer workload characterization, load balancing, and capacity projection. Advantageously, no detection or handling is required for performance counter overflow, and the invention can support massive numbers of counters. The accumulation can be performed entirely by hardware. Continuous hardware performance counter monitoring can be enabled from power-up of the "big box" computer system (the set of cores controlled by a single firmware) to power-down. The invention is particularly easy to implement since it requires no special system bus connections. Unlike prior art monitoring systems, the present invention allows for virtualization and code state breakouts, with minimal virtualization overhead, and count accumulation tables specific to a partition are persistent in memory. The invention also allows for simple and uniform interfaces for in-band or out-band performance monitoring applications, with one writer, many readers, and no waiting. The invention further economizes use of memory bandwidth.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the specific context of a memory controller which performs accumulations using an atomic read/add/write instruction, the inventive concepts herein are more generally applicable to a "smart" memory controller that can generally carry out operations on performance data. It is therefore contemplated that such modifications can be made without departing from the spirit or scope of the present invention as defined in the appended claims.

What is claimed is:

1. A method of accumulating a hardware count for an electronic system comprising:
    maintaining at least one current count value for at least one counted event of a hardware component of the electronic system in a hardware counter unit;
    sending the current count value to a memory controller which controls access to a system memory device of the electronic system; and
    the memory controller responsively updating an accumulated count value stored in the system memory device of the electronic system using the current count value.

2. The method of claim 1 wherein said updating of the accumulated count value comprises incrementing the accumulated count value according to the current count value.

3. The method of claim 1 wherein the electronic system is a computer system and the hardware component is a processor core the computer system which processes program instructions residing in the system memory device.

4. The method of claim 1 wherein said sending is performed by a sending unit which periodically samples performance data from the hardware counter unit including the current count value and transmits the current count value to a bus interface for an interconnection bus which communicates with the memory controller.

5. The method of claim 1 wherein said sending includes providing a memory pointer to a location in the system memory device and an instruction on how the location is to be updated.

6. The method of claim 5 wherein the instruction is for an atomic read-modify-write operation.

7. The method of claim 6 wherein the memory controller includes a dedicated arithmetic logic unit, and the atomic read-modify-write operation is carried out using the dedicated arithmetic logic unit.

8. The method of claim 1, further comprising harvesting the accumulated count value by reading the accumulated count value from the system memory device and providing it to a performance monitor.

9. An electronic system comprising:
a plurality of hardware components;
a system memory device;
at least one hardware counter unit which maintains at least one current count value for at least one current counted event of one of the hardware components; and
a memory controller which controls access to said system memory device, and receives the current count value and responsively updates an accumulated count value stored in said system memory device using the current count value.

10. The electronic system of claim 9 wherein said memory controller updates the accumulated count value by incrementing the accumulated count value according to the current count value.

11. The electronic system of claim 9 being a computer system, and wherein the hardware component is a processor core which processes program instructions residing in said system memory device.

12. The electronic system of claim 9 further comprising:
an interconnection bus which communicates with said memory controller;
a bus interface for said interconnection bus; and
a sending unit which periodically samples performance data from said hardware counter unit including the current count value and transmits the current count value to said bus interface.

13. The electronic system of claim 9 wherein said memory controller receives, with the current count value, a memory pointer to a location in said system memory device and an instruction on how the location is to be updated.

14. The electronic system of claim 13 wherein the instruction is for an atomic read-modify-write operation.

15. The electronic system of claim 14 wherein said memory controller includes a dedicated arithmetic logic unit, and the atomic read-modify-write operation is carried out using said dedicated arithmetic logic unit.

16. The electronic system of claim 9 further comprising a performance monitor which harvests the accumulated count value by reading the accumulated count value from the system memory device.

17. A data harvester application for an electronic device in the form of a computer program product comprising:
a non-transitory computer-readable storage medium; and
program instructions residing in said storage medium for reading performance data from a table in a system memory device of a computer system wherein the performance data includes at least one accumulated count value for at least one counted event of a hardware component of the computer system.

18. The data harvester application of claim 17 wherein said program instructions are adapted to read the performance data from a table having multiple table sectors, each table sector having a plurality of records sets pertaining to different filtered events, and each record set containing one or more accumulated count values.

19. The data harvester application of claim 17 wherein said program instructions further obtain entrance counts from record sets of the table, obtain exit counts from the same record sets a predefined measurement interval after obtaining the entrance counts, and calculate exit-to-entrance count deltas.

20. The data harvester application of claim 17 wherein the table includes a plurality of record sets, and said program instructions support asynchronous reading of the performance data by using a timestamp to indicate that a given record set has been completely posted to memory.

* * * * *